(12) United States Patent
Henrichsen et al.

(10) Patent No.: US 11,959,454 B2
(45) Date of Patent: Apr. 16, 2024

(54) METHOD AND A SYSTEM FOR ASSEMBLING BLADE PARTS OF A WIND TURBINE BLADE

(71) Applicant: Siemens Gamesa Renewable Energy A/S, Brande (DK)

(72) Inventors: Soeren Randrup Daugaard Henrichsen, Vodskov (DK); Mogens Nielsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/765,472

(22) PCT Filed: Sep. 22, 2020

(86) PCT No.: PCT/EP2020/076438
§ 371 (c)(1),
(2) Date: Mar. 31, 2022

(87) PCT Pub. No.: WO2021/073842
PCT Pub. Date: Apr. 22, 2021

(65) Prior Publication Data
US 2022/0364548 A1 Nov. 17, 2022

(30) Foreign Application Priority Data
Oct. 18, 2019 (EP) .................... 19204065

(51) Int. Cl.
*B29C 70/34* (2006.01)
*B29C 70/44* (2006.01)
(Continued)

(52) U.S. Cl.
CPC ............ *F03D 13/10* (2016.05); *B29C 70/342* (2013.01); *B29C 70/443* (2013.01); *B29C 70/54* (2013.01);
(Continued)

(58) Field of Classification Search
CPC ..... F03D 13/10; F03D 1/0675; B29C 70/342; B29C 70/443; B29C 70/54; B29C 70/84;
(Continued)

(56) References Cited

U.S. PATENT DOCUMENTS

2006/0127222 A1* 6/2006 Arelt .................... F03D 1/0675
416/224
2012/0124833 A1* 5/2012 Arendt .................. F03D 13/40
29/889.7
(Continued)

FOREIGN PATENT DOCUMENTS

| CN | 1695006 A | 11/2005 |
| CN | 102803656 A | 11/2012 |

(Continued)

OTHER PUBLICATIONS

PCT International Search Report and Written Opinion of International Searching Authority dated Dec. 15, 2020 corresponding to PCT International Application No. PCT/EP2020/076438 filed Sep. 22, 2020.

*Primary Examiner* — Ryan J. Walters
(74) *Attorney, Agent, or Firm* — Schmeiser, Olsen & Watts, LLP (57) ABSTRACT

A method for assembling blade parts of a wind turbine blade includes the steps of: obtaining information about a connection area of a blade part, at least one of selecting, customizing and manufacturing an adaptor piece depending on the obtained information about the connection area of the blade part, wherein the adaptor piece serves to connect the blade part with at least another blade part, and connecting the blade part to the adaptor piece. Independently manufactured blade parts of a wind turbine blade are assembled in a manner such that the assembled blade comes as close as possible to a single-casted blade.

13 Claims, 5 Drawing Sheets

(51) Int. Cl.
*B29C 70/54* (2006.01)
*B29C 70/84* (2006.01)
*B29C 70/86* (2006.01)
*F03D 1/06* (2006.01)
*F03D 13/10* (2016.01)
*B29L 31/08* (2006.01)

(52) U.S. Cl.
CPC ............ *B29C 70/84* (2013.01); *B29C 70/865* (2013.01); *F03D 1/0675* (2013.01); *B29L 2031/085* (2013.01); *F05B 2230/60* (2013.01)

(58) Field of Classification Search
CPC ............ B29C 70/865; B29L 2031/085; F05B 2230/60; Y02E 10/72; Y02P 70/50
See application file for complete search history.

(56) References Cited

U.S. PATENT DOCUMENTS

| | | |
|---|---|---|
| 2019/0299343 A1 | 10/2019 | Schuring |
| 2019/0385326 A1* | 12/2019 | Baqersad ............ H04N 13/243 |
| 2021/0010460 A1* | 1/2021 | Henrichsen ............ B29C 66/54 |

FOREIGN PATENT DOCUMENTS

| | | |
|---|---|---|
| CN | 103670953 A | 3/2014 |
| CN | 107850042 A | 3/2018 |
| CN | 110177933 A | 8/2019 |
| DE | 10235496 A1 | 2/2004 |
| WO | 2011098506 A1 | 8/2011 |
| WO | 2016198075 A1 | 12/2016 |
| WO | WO-2018215457 A1 * | 11/2018 ........... F03D 1/0675 |

* cited by examiner

METHOD AND A SYSTEM FOR ASSEMBLING BLADE PARTS OF A WIND TURBINE BLADE

CROSS-REFERENCE TO RELATED APPLICATIONS

This application claims priority to PCT Application No. PCT/EP2020/076438, having a filing date of Sep. 22, 2020, which claims priority to EP Application No. 19204065.7, having a filing date of Oct. 18, 2019, the entire contents both of which are hereby incorporated by reference.

FIELD OF TECHNOLOGY

The following relates to a method for assembling blade parts of a wind turbine blade and a corresponding system.

BACKGROUND

As wind turbine blades become longer, it is advantageous to divide such blades into a plurality of blade parts which are individually molded, for example by different manufacturers, and subsequently assembled. When the blade parts are assembled, it is important that the blade resulting structure is as much as possible identical to a blade which is casted in one piece.

Since different blade parts may come from different molds, correct assembly of the blade parts may become difficult due to an insufficient match and/or quality of a connection area of a blade part.

For example, when blade parts are assembled, it is important that the tip of a blade is placed correctly with respect to the root and that the twist of the blade is as designed. If this is not the case, then loads throughout the wind turbine may change and the annual energy production may change. In a worst-case scenario, the wind turbine blade may even strike the tower of the wind turbine.

SUMMARY

An aspect relates to provide a way of ensuring that independently manufactured blade parts can be assembled in a manner such that the assembled blade comes as close as possible to a single-casted blade.

Accordingly, a method for assembling blade parts of a wind turbine blade is provided. The method comprises obtaining information about a connection area of a blade part, selecting, customizing and/or manufacturing an adaptor piece depending on the obtained information about the connection area of the blade part, wherein the adaptor piece serves to connect the blade part with at least another blade part, and connecting the blade part to the adaptor piece.

By for example identifying the geometry of the connection area of the blade part, the adaptor piece for connecting multiple blade parts can be provided in an improved manner. The size of the connection can be determined such that the adaptor piece does not have to be adjusted in the mold, i.e., when connecting the blade part and the adaptor piece. The presented solution rather allows an "offline kitting" for connecting multiple blade parts.

The step of obtaining information about the connection area of the blade part further allows to determine the quality of the connection area and to provide information about the same to a manufacturer of the blade part. Since the manufacturer can use this quality control feedback to enhance a material placement of parts to be assembled, a manufacturing process can be improved.

Moreover, it can be determined if different blade parts would match and whether they should be assembled or not. Accordingly, the structural performance of the assembled blade is optimized since only the best fitting parts may be selected for being connected to each other.

The blade part, other blade part (as mentioned hereinafter) and/or the adaptor piece may be provided as a fiber lay-up with or without resin. The resin may be cured, partially cured or uncured. Examples of fibers include glass fibers or carbon fibers. The resin may include a thermoplastic or duroplastic material, for example. Also, the lay-up(s) may include wood such as balsa wood.

"Selecting an adaptor piece" includes choosing one adaptor piece from multiple adaptor pieces previously manufactured, i.e., prior to the step of choosing the one adaptor piece.

"Customizing an adaptor piece" includes changing the geometry of an existing (previously manufactured) adaptor. This may include machining the adaptor piece, adding or removing fiber layers etc.

"Manufacturing an adaptor piece" includes producing a fiber lay-up (from scratch). The fiber lay-up may include a resin. The resin may be cured, partially cured or uncured.

According to an embodiment, the step of obtaining information about the connection area comprises placing tracker markers on the blade part and recording positions of the placed tracker markers.

This allows a simple and cost-effective way of obtaining information about the connection area.

According to a further embodiment, the tracker markers are placed at predefined geometric details and/or layup details in the connection area of the blade part.

According to a further embodiment, the tracker markers are casted in the blade part.

This is particularly advantageous since the tracker markers may be automatically integrated into the blade part during manufacturing of the same and hence, a manual placement of tracker markers after the manufacturing is not required anymore.

According to a further embodiment, the step of obtaining the information about the connection area of the blade part comprises performing a Digital Image Correlation (DIC) using a stereoscopic camera device.

This has the advantage that the blade part does neither have to be manipulated during manufacturing nor after manufacturing since the DIC allows to obtain the information about the connection area solely based on recorded image data. Instead of DIC, laser scanners, radar, trackers etc. could be used for obtaining the information about the connection area of the blade part, i.e., for surface recognition. In principle one may use any equipment/method which can return a 3D surface.

According to a further embodiment, the step of selecting, customizing and/or manufacturing the adaptor piece comprises providing the obtained information to the adaptor piece by projecting optical lines onto the adaptor piece.

According to a further embodiment, the optical lines represent a geometry which the adaptor piece should have to provide correct dimensions for connecting the blade part to the adaptor piece.

This may comprise projecting laser lines on a mold of the adaptor piece, wherein the laser lines can be either flattened or curved.

According to a further embodiment, the adaptor piece is selected, customized and/or manufactured depending on the obtained information about the connection area of the blade part and/or the other blade part.

Therein, the selection may be either done by a computer algorithm or manually. Since the obtained information about the connection area of the blade part or the other blade part is taken into consideration, an adaptor piece requiring a minimum customization effort can be selected.

According to a further embodiment, the blade part is manufactured using a first mold and the adaptor piece is manufactured using a second mold which is different from the first mold.

According to a further embodiment, the step of connecting the blade part to the adaptor piece comprises aligning the blade part and the adaptor piece with respect to each other, laying fibers across the blade part and the adaptor piece to build a fiber layup, infusing the fibers with a resin, and curing the resin.

This process allows a solid bond between the blade part and the adaptor piece which provides a structure which is similar to the structure of a single-casted blade.

According to a further embodiment, the connection area of the blade part comprises a recess and the adaptor piece comprises a protrusion which corresponds to the recess.

Providing a recess at the blade part and a protrusion at the adaptor piece allows a simple but stable connection.

According to a further embodiment, the step of obtaining the information about the connection area of the blade part comprises measuring the recess.

According to a further embodiment, the step of selecting, customizing and/or manufacturing the adaptor piece and/or the step of connecting the blade part, other blade part and/or the adaptor piece comprises using a resin infusion process, in particular a vacuum infusion process.

According to a further embodiment, the method comprises obtaining information about a connection area of the other blade part, selecting, customizing and/or manufacturing the adaptor piece depending on the obtained information about the connection area of the other blade part, and connecting the other blade part to the adaptor piece.

According to a further aspect, embodiments of the invention relate to a system for assembling blade parts of a wind turbine blade comprising (first) means configured to obtain information about a connection area of a blade part, (second) means configured to select, customize and/or manufacture an adaptor piece depending on the obtained information about the connection area of the blade part, wherein the adaptor piece serves to connect the blade part with at least another blade part, and (third) means configured to connect the blade part to the adaptor piece.

The first means may include a camera, the second means a projector device, and the third means a resin infusion device, an autoclave etc.

The embodiments and features described with reference to the method of embodiments of the present invention apply mutatis mutandis to the system of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

In the Figures, like reference numerals designate like or functionally equivalent elements, unless otherwise indicated.

Figure 1:
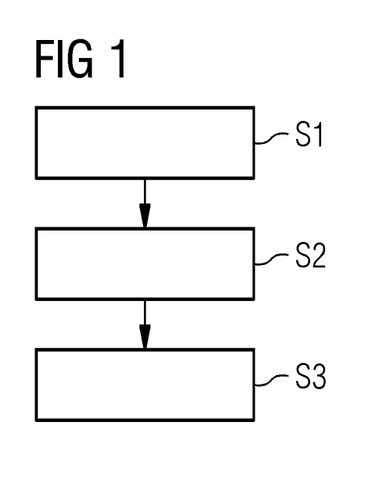
FIG. 1 shows a flowchart illustrating a method for assembling blade parts of a wind turbine blade.

FIG. 1 shows a flowchart illustrating a method for assembling a blade part 1 (see FIG. 8) of a wind turbine blade 2 with another blade part 8 using an adaptor piece 7. The blade parts 1, 8 and the adaptor piece 7 are made from a lay-up of fibers, respectively, and may include a cured, partially cured or uncured resin.

In step S1, information about a connection area 3 (see FIG. 2) of the blade part 1 arranged on a mold 16 is obtained. This may be done by placing tracker markers 4 on the blade part 1 and recording positions of the placed tracker markers 4 with a capturing device such as a camera 5, for example a conventional 2D camera. Therein, the tracker markers 4 are placed at predefined geometric details and/or layup details in the connection area 3 of the blade part 1.

The tracker markers 4 may either be placed in the connection area 3 after manufacturing the blade part 1 or may be casted in the blade part 1 during manufacturing. The step of manufacturing may include building a fiber lay-up and, optionally, infusing said lay-up with a resin. The resin may or may not be in a cured state. Curing is done in an autoclave.

As an alternative to using tracker markers 4, the step of obtaining the information about the connection area 3 of the blade part 1 may comprise performing a Digital Image Correlation (DIC) using a stereoscopic camera device 6. Step S1 serves to identify exact dimensions (geometries) of the connection area 3 which are subsequently used to provide the adaptor piece 7.

In step S2, the adaptor piece 7 is selected, customized and/or manufactured depending on the obtained information about the connection area 3 of the blade part 1. The adaptor piece 7 serves to connect the blade part 1 with at least another blade part 8.

According to a first alternative, the adaptor piece 7 is selected (from multiple adaptor pieces 7 previously manufactured) and the adaptor piece 7 is customized based on the information obtained from the connection area 3 of the blade part 1. Customizing the adaptor piece 7 may comprise changing its geometry by adding or removing fiber layers, for example. The adaptor piece 7 may not be completely cured such that a further customizing of the adaptor piece 7 is still possible.

By projecting optical lines 9, such as laser lines, onto the pre-manufactured adaptor piece 7 which has been selected, the information obtained from the blade part 1 is provided to the adaptor piece 7. The optical lines 9 represent a geometry which the adaptor piece 7 should have to provide correct dimensions for connecting the blade part 1 to the adaptor piece 7 and hence, a customization of the adaptor piece 7 is possible in a simple manner.

According to a second alternative, the information obtained from the connection area 3 of the blade part 1 may be used to manufacture the adaptor piece 7, rather than merely customizing or selecting the adaptor piece 7. Manufacturing the adaptor piece 7 may include forming a lay-up of fibers.

The adaptor piece 7 may be provided to the assembly site after selecting the same, customized or manufactured on a mold 17.

In each of the two alternatives, the connection area 3 of the blade part 1 may comprise a recess 10 and the adaptor piece 7 may comprise a protrusion 11 which corresponds to the recess 10. In such case, the preceding step of obtaining the information about the connection area 3 of the blade part 1 comprises measuring the recess 10.

In step S3, the blade part 1 is connected to the adaptor piece 7. This may comprise aligning the blade part 1 and the adaptor piece 7 with respect to each other, laying fibers across the blade part 1 and the adaptor piece 7 to build a fiber layup, infusing the fibers with a resin (for example in a vacuum resin infusion process), and curing the resin (for example in an autoclave).

Figure 2:
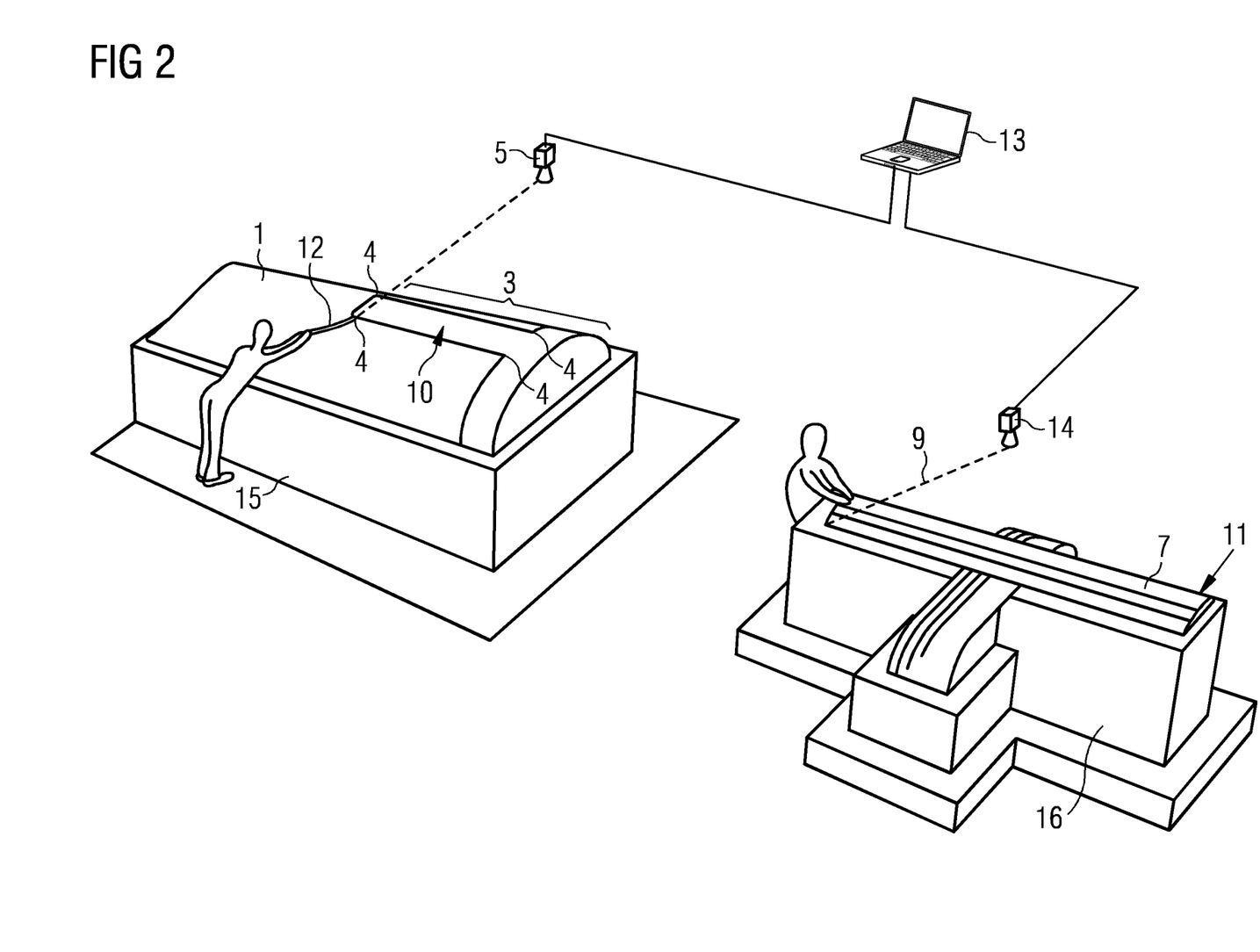
FIG. 2 shows, in a perspective view, a step of obtaining information about a connection area of a blade part, and a step of selecting, customizing and/or manufacturing an adaptor piece depending on the obtained information.

The drawing on the left side of FIG. 2 shows a step of placing tracker markers 4 on the blade part and recording positions of the placed tracker markers 4. Therein, the tracker markers 4 are placed at predefined geometric details and/or layup details in the connection area 3 of the blade part 3. The tracker markers 4 may be placed by means of a stick 12 which is configured to provide the tracker markers 4. As an alternative, the tracker markers 4 may also be placed using a robotic arm or the like. After the tracker markers 4 have been placed, the positions of the placed tracker markers 4 are recorded. For this purpose, a capturing device such as camera 5 is arranged above the blade part 2. The camera 5 records the positions of all tracker markers 4 and provides corresponding information to a processing device 13 such as a notebook computer or the like.

The drawing on the right side of FIG. 2 shows the step of selecting, customizing and/or manufacturing an adaptor piece 7 depending on the obtained information about the tracker markers 4. For this purpose, the processing device 13 is connected to a projector device 14 which emits optical lines 9, such as laser lines, based on obtained the information. The optical lines 9 indicate on an adaptor piece 7 that has been selected, for example depending on the obtained information about the connection area 3 of the blade part 1, how the selected adaptor piece 7 should be customized. A customization of the adaptor piece 7 can be subsequently carried out as described above. Instead of selecting an adaptor piece 7 and customizing the same, a new adaptor piece 7 could be manufactured based on the obtained information by projecting optical lines 9 onto a mold.

Figure 3:
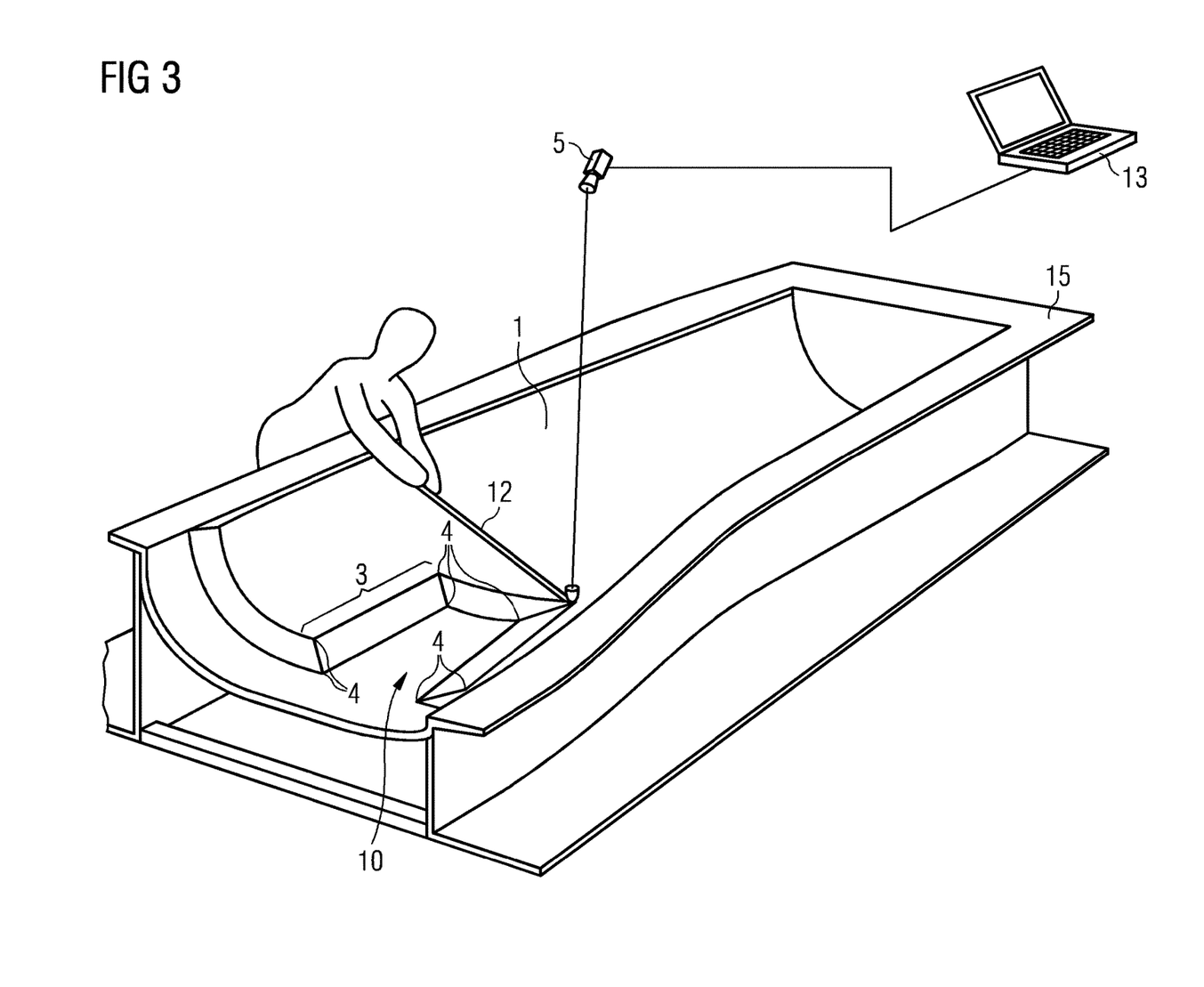
FIG. 3 shows, in a perspective view, a step of obtaining information about a connection area of a blade part according to a first embodiment.

As it is apparent from FIG. 3 in more detail, a plurality of tracker markers 4 is placed at predefined geometric details and/or layup details in the connection area 3 of the blade part 1. The information about the positions of the tracker markers 4 is obtained using a capturing device such as a camera 5, for example a conventional 2D camera. After the information has been obtained, it is provided to the processing device 13. The information may also serve to check the quality of a connection area in terms of allowed tolerances, offsets and the like.

Figure 4:
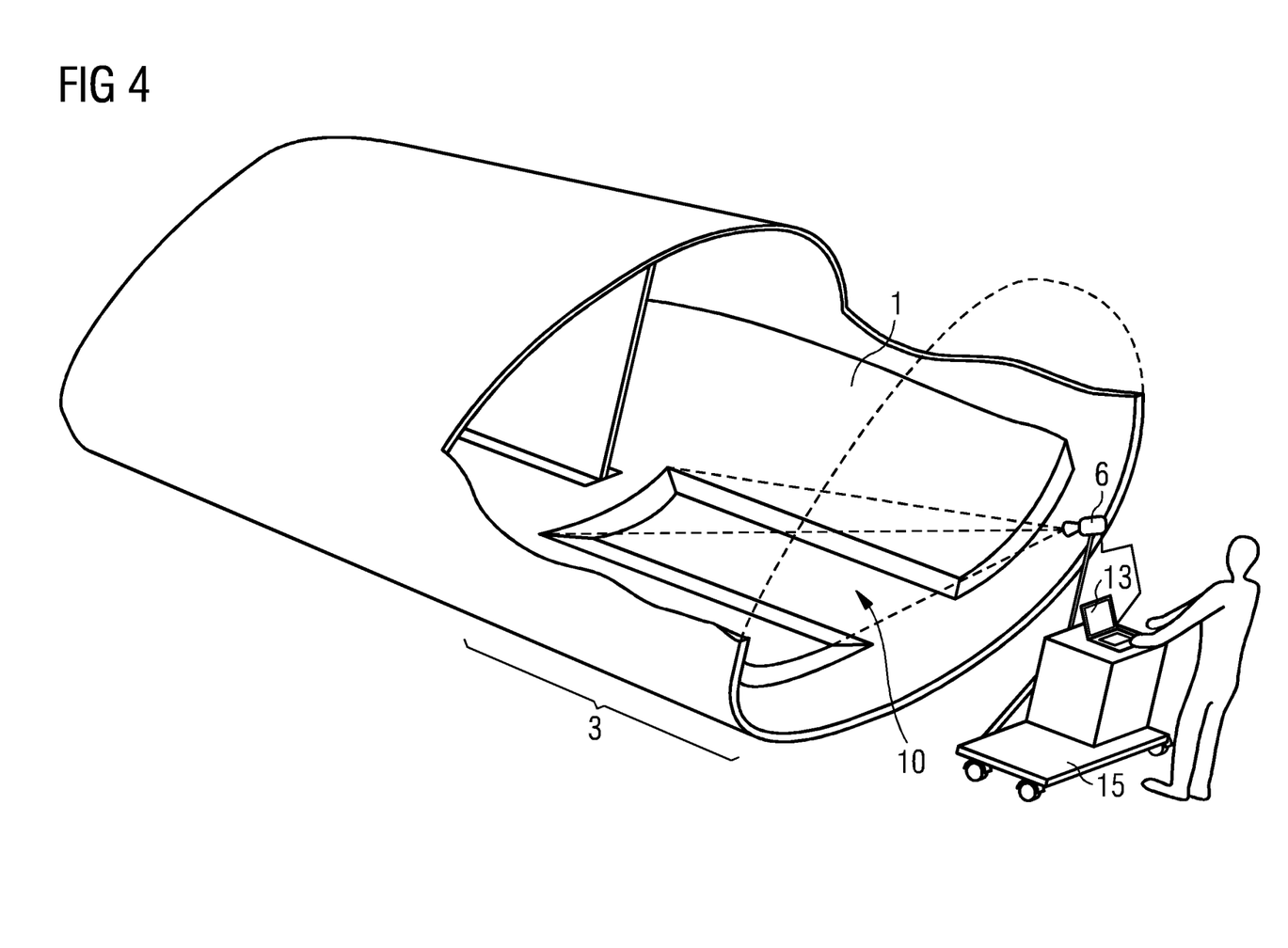
FIG. 4 shows, in a perspective view, a step of obtaining information about a connection area of a blade part according to a second embodiment.

FIG. 4 shows a step of obtaining information about a connection area 3 by performing a Digital Image Correlation (DIC) using a stereoscopic camera device 6, also known as a 3D camera. This makes the step of placing tracker markers 4 on the blade part 1 redundant. In order to position the stereoscopic camera device 6 in a simple manner, the same may be attached to a cart 15. The cart 15 may also serve to hold the processing device 13 in form of a notebook computer in order to allow personnel to verify if information of the connection area 3 is properly obtained. As an alternative, the stereoscopic camera device 6 may also be operated by a robot arm or the like, thereby using image recognition technologies to verify a proper alignment of the stereoscopic camera device 6 with respect to the blade part 1.

Figure 5:
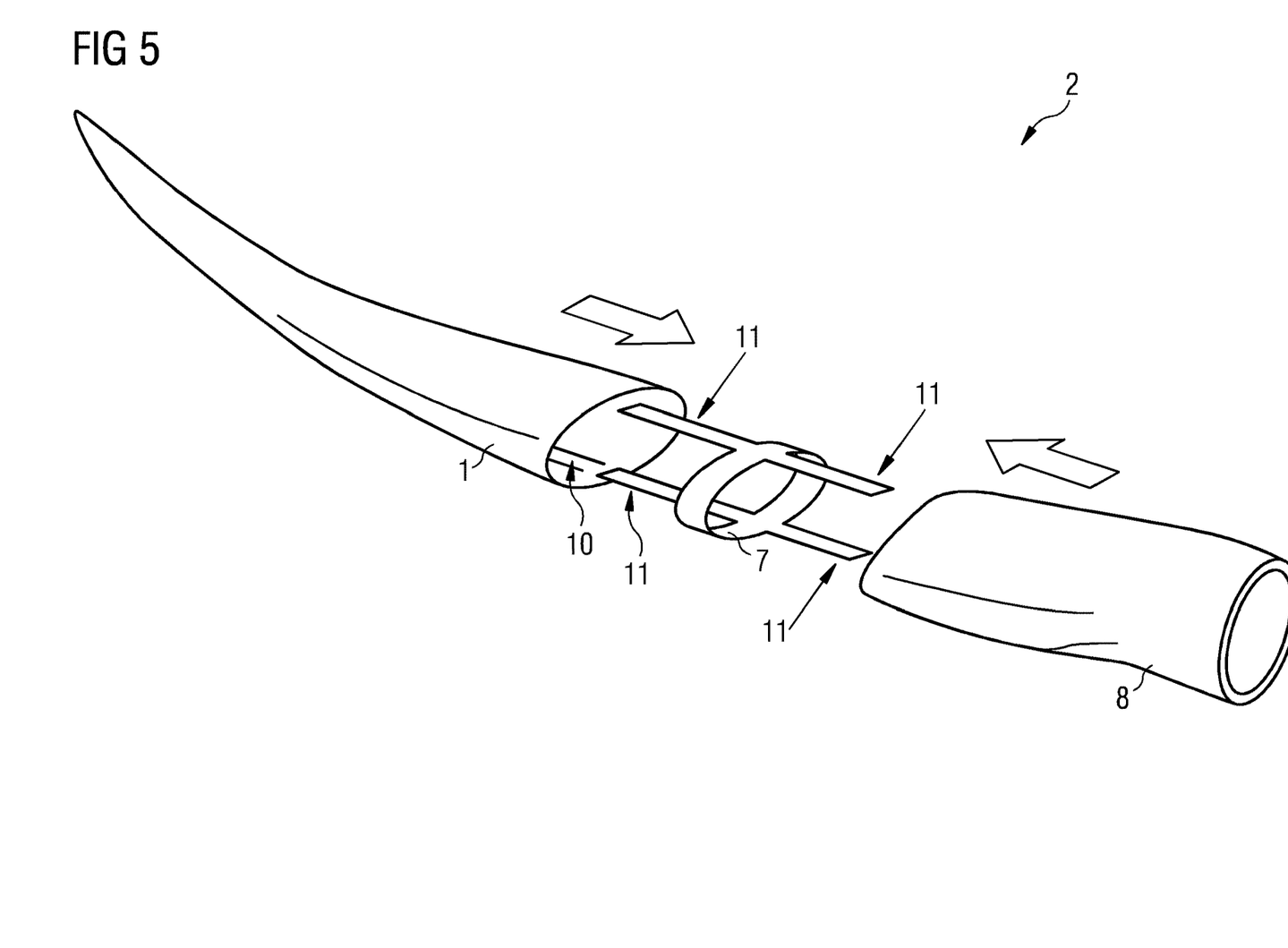
FIG. 5 shows, in a perspective view, a step of connecting two blade parts to an adaptor piece.

FIG. 5 shows the step of connecting the two blade parts 1, 8 to an adaptor piece 7. Prior to connecting the blade parts 1, 8 to the adaptor piece 7, the adaptor piece 7 has been customized based on information obtained about a connection area 3 of the first blade part 1 and about a connection area 3 of the second blade part 8.

According to the embodiment of FIG. 5, the first blade part 1 and the second blade part 8 may each comprise two further parts, for example a lower half and an upper half. That is, the adaptor piece 7 was customized with regard to four protrusions 11, wherein each of the protrusions 11 corresponds to a recess 10 in the respective upper and lower halves of the first blade part 1 and to a recess in the respective upper and lower halves of the second blade part 8. The step of connecting the respective blade part 1, 8 to the adaptor piece 7 comprises aligning the blade part 1, 8 and the adaptor piece 7 with respect to each other, laying fibers across the blade part 1, 8 and the adaptor piece 7 to build a fiber layup, infusing the fibers with a resin, and curing the resin.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for assembling blade parts of a wind turbine blade, the method comprising the steps of:
   obtaining information about a connection area of a blade part,
   selecting, customizing and/or manufacturing an adaptor piece depending on the obtained information about the connection area of the blade part, wherein the adaptor piece serves to connect the blade part with at least another blade part, and
   connecting the blade part to the adaptor piece,
   wherein the step of obtaining information about the connection area comprises placing tracker markers on the blade part and recording positions of the placed tracker markers, and wherein the tracker markers are casted in the blade part.

2. The method according to claim 1,
   wherein the tracker markers are placed at predefined geometric details and/or layup details in the connection area of the blade part.

3. The method according to claim 1,
   wherein the step of obtaining the information about the connection area of the blade part comprises performing a Digital Image Correlation (DIC) using a stereoscopic camera device.

4. The method according to claim 1,
wherein the step of selecting, customizing and/or manufacturing the adaptor piece comprises providing the obtained information to the adaptor piece by projecting optical lines onto the adaptor piece.

5. The method according to claim 4,
wherein the optical lines represent a geometry having correct dimensions for connecting the blade part to the adaptor piece.

6. The method according to claim 1,
wherein the adaptor piece is selected, customized and/or manufactured depending on the obtained information about the connection area of the blade part and the other blade part.

7. The method according to claim 1,
wherein the blade part is manufactured using a first mold and the adaptor piece is manufactured using a second mold which is different from the first mold.

8. The method according to claim 1,
wherein the step of connecting the blade part to the adaptor piece comprises aligning the blade part and the adaptor piece with respect to each other, laying fibers across the blade part and the adaptor piece to build a fiber layup, infusing the fibers with a resin, and curing the resin.

9. The method according to claim 1,
wherein the connection area of the blade part comprises a recess and the adaptor piece comprises a protrusion which corresponds to the recess.

10. The method according to claim 9,
wherein the step of obtaining the information about the connection area of the blade part comprises measuring the recess.

11. The method according to claim 1,
wherein the step of selecting, customizing and/or manufacturing the adaptor piece and/or the step of connecting the blade part, other blade part and/or the adaptor piece comprises using a resin infusion process.

12. The method according to claim 1, further comprising:
obtaining information about a connection area of the other blade part,
selecting, customizing and/or manufacturing the adaptor piece depending on the obtained information about the connection area of the other blade part, and
connecting the other blade part to the adaptor piece.

13. The method according to claim 1,
wherein the step of selecting, customizing and/or manufacturing the adaptor piece and/or the step of connecting the blade part, other blade part and/or the adaptor piece comprises using a vacuum infusion process.

* * * * *